(12) United States Patent
Frey et al.

(10) Patent No.: US 6,901,459 B2
(45) Date of Patent: May 31, 2005

(54) PROTOCOL FOR TRANSMITTING A PLURALITY OF MULTIPLE EXCHANGE LOGIC FLOW OF COMMAND/RESPONSE PAIRS ON A SINGLE PHYSICAL EXCHANGE CHANNEL BETWEEN MASTER AND SLAVE AND CORRESPONDING SYSTEM FOR CONTROLLING AND MONITORING EXECUTION OF APPLETS

(75) Inventors: Alexandre Frey, Paris (FR); Cédric Mesnil, Les Clayes Sous Bois (FR)

(73) Assignee: Trusted Logic (FR)

( * ) Notice: Subject to any disclaimer, the term of this patent is extended or adjusted under 35 U.S.C. 154(b) by 24 days.

(21) Appl. No.: 10/399,729

(22) PCT Filed: Oct. 17, 2001

(86) PCT No.: PCT/FR01/03207
§ 371 (c)(1),
(2), (4) Date: Sep. 11, 2003

(87) PCT Pub. No.: WO02/33866
PCT Pub. Date: Apr. 25, 2002

(65) Prior Publication Data
US 2004/0054817 A1 Mar. 18, 2004

(30) Foreign Application Priority Data
Oct. 20, 2000 (FR) .......................................... 00 13476

(51) Int. Cl.$^7$ ................................................. G06F 3/00
(52) U.S. Cl. ........................... 710/15; 710/240; 717/139
(58) Field of Search ........................ 710/15, 240, 243; 711/100, 103, 139, 114, 143; 235/492

(56) References Cited

U.S. PATENT DOCUMENTS 6,308,317 B1 * 10/2001 Wilkinson et al. .......... 717/139
6,684,389 B1 * 1/2004 Tanaka et al. ............... 717/140
6,736,325 B1 * 5/2004 Peacham ..................... 235/492
6,748,592 B1 * 6/2004 Porter ......................... 718/100
6,772,955 B2 * 8/2004 Yoshimoto et al. ......... 235/492
6,792,612 B1 * 9/2004 Baentsch et al. ........... 719/331

FOREIGN PATENT DOCUMENTS

| EP | 0 992 958 | 12/2000 |
| FR | 2 791 159 | 9/2000 |
| WO | WO 9819237 | 5/1998 |

OTHER PUBLICATIONS

Iso : <<7816 part 4 : Interindustry command for interchange >> ISO/IEC, 'en ligne! Nov. 26, 1998, XP002169265, Extrait de l'internet : <URL : www.geocities.com/Research-Triangle/Lab/15/8/iso/8164.htm> 'extrait le Jun. 6, 2001 ! * alinéa '05.3 !—alinéa '5.3.3!* * alinéa '05.5!*.
Interoperability Specification for ICCs and Personal Computer Systems, version 1.0, Dec. 1997, parts 1 to 8 published by PC/SC Workgroup and accessible at the address [www.pcscworkgroup.com].
Framework 1.2 . . . Programmer's Guide 4th Edition, Dec. 1999 Framework.1.1.1 . . . Programmer's Guide, 3 rd Edition, Apr. 1999, Published by OpenCard Consortium and available at the address, [www.Opencard.org].
* JAVA TM Debug Wire Protocol accessible at the address [http://java.sun.com/products/jpda/doc/jdwp–spec.html].

* cited by examiner

*Primary Examiner*—Jeffrey Gaffin
*Assistant Examiner*—Harold Kim
(74) *Attorney, Agent, or Firm*—DLA Piper Rudnick Gray Cary US LLP

(57) ABSTRACT

An existing active base logic flow between a master transceiver and a slave transceiver, is selected as reference logic flow wherein is generated a set of concurrent logic flows. The concurrent logic flows are built with successive elementary packets segmenting pairs of command/response. An exchange of pairs of command/response is initialised and continued by the master transceiver on the basis of specific commands. The slave transceiver triggers a segmentation by transmitting specific responses on the reference logic flow.

15 Claims, 10 Drawing Sheets

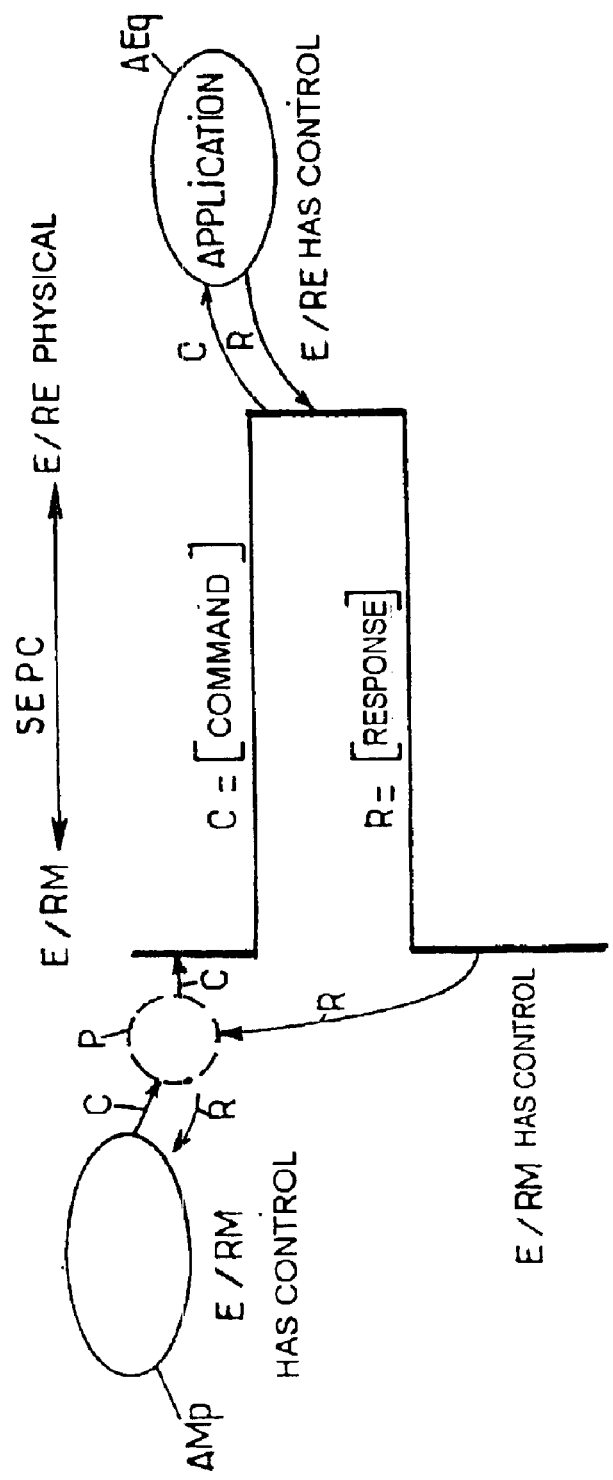
FIG. 2a. EXCHANGE OF A C, R PAIR ON BLF_i ON SINGLE PHYSICAL EXCHANGE CHANNEL (SEPC)

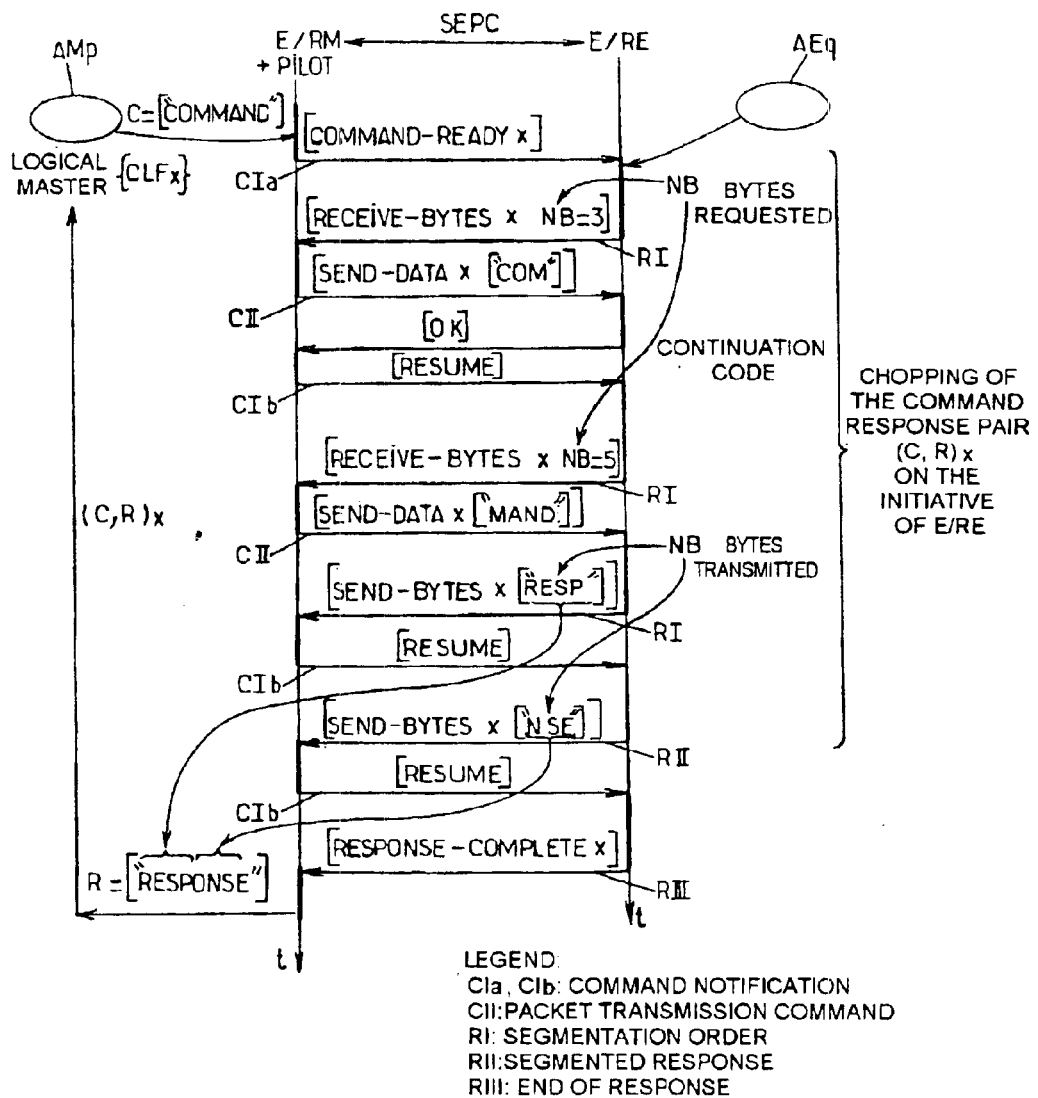
FIG. 2b. CHOPPING OF AN EXCHANGE BY CONCURRENT LOGICAL FLOW

INTERLEAVING OF TWO EXCHANGES BY CONCURRENT LOGIC FLOWS

PROCESSING OF A REQUEST FOR EXCHANGE BY CONCURRENT
LOGIC FLOW {CLFx'} DURING LENGTHY PROCESSING OF
ANOTHER EXCHANGE BY CONCURRENT LOGIC FLOW {CLFx.}

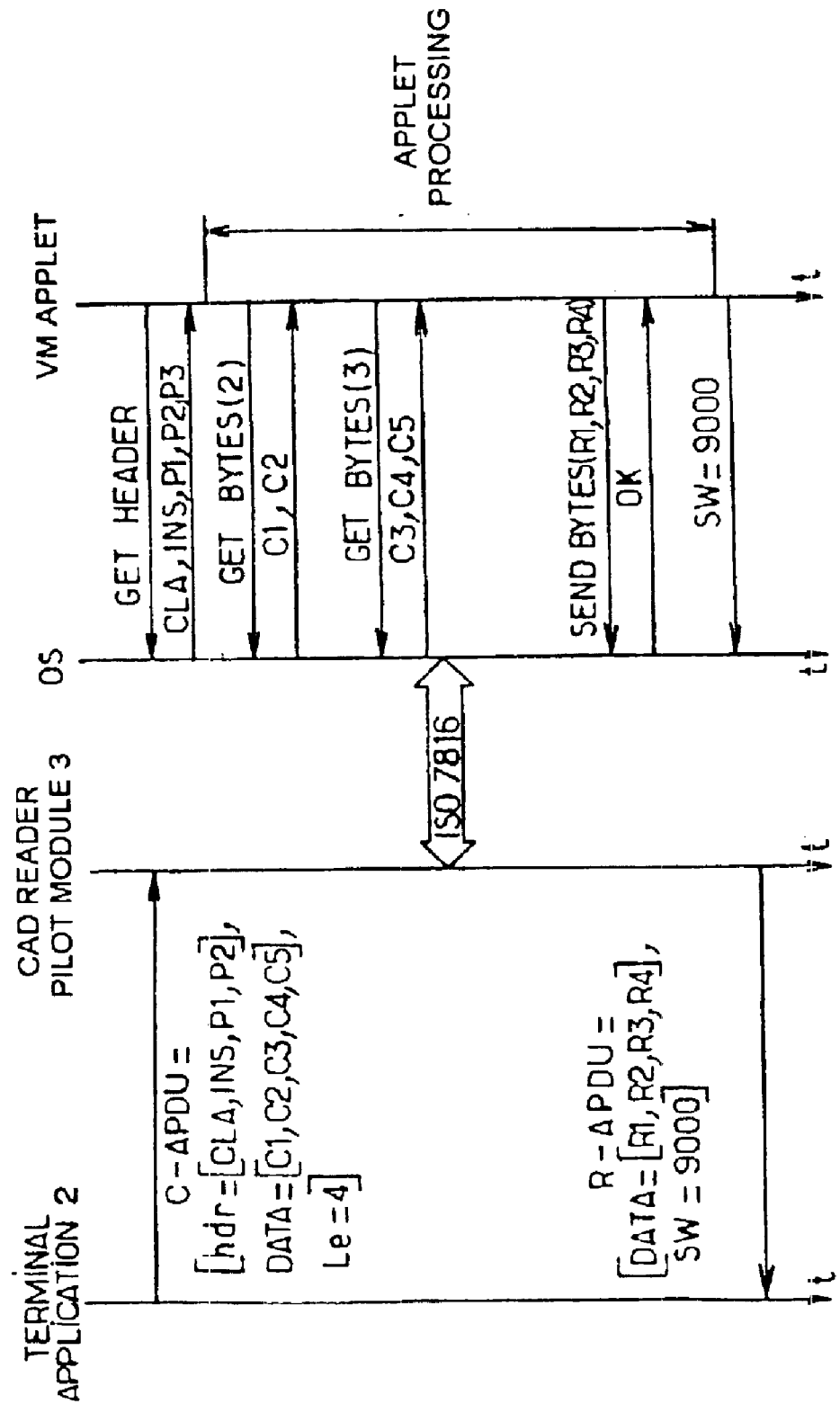
FIG. 4a. NON-DEBUGGED MODE

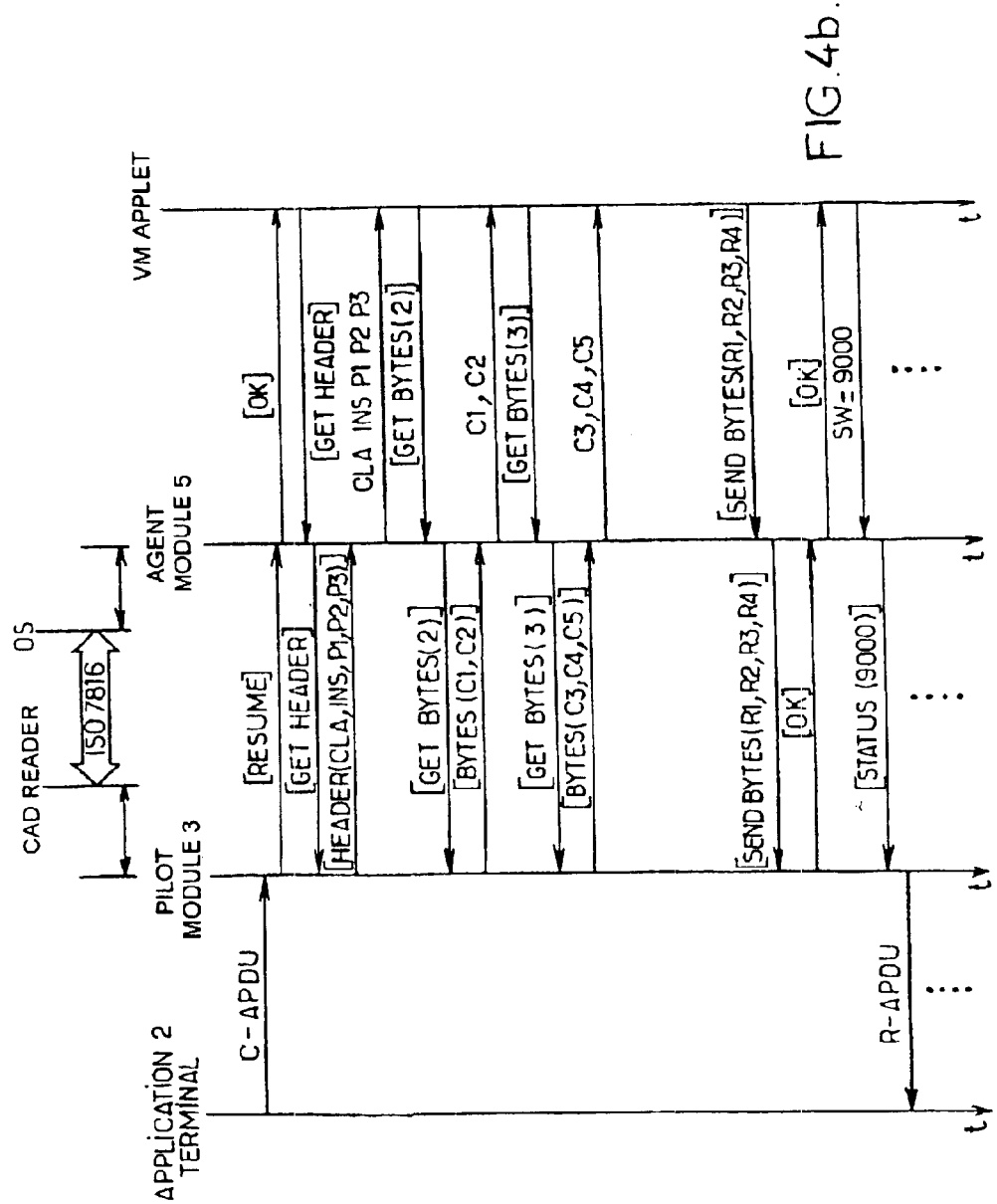

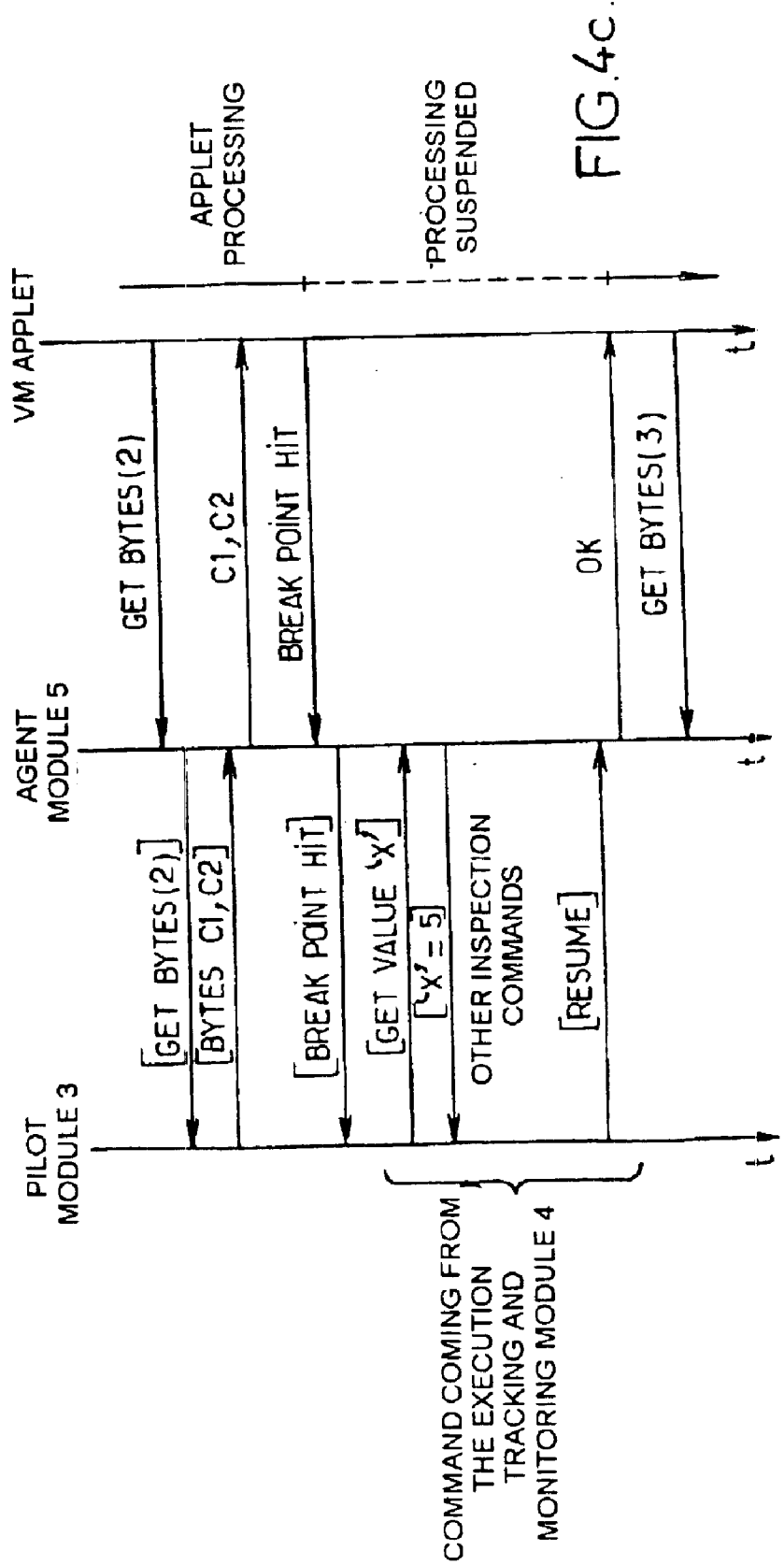

PROTOCOL FOR TRANSMITTING A PLURALITY OF MULTIPLE EXCHANGE LOGIC FLOW OF COMMAND/RESPONSE PAIRS ON A SINGLE PHYSICAL EXCHANGE CHANNEL BETWEEN MASTER AND SLAVE AND CORRESPONDING SYSTEM FOR CONTROLLING AND MONITORING EXECUTION OF APPLETS

The present invention pertains to a method for the transmission of logical flows for multiple exchange of command/response pairs on a single physical exchange channel, between a master transceiver and a slave transceiver, and to the applications of such a protocol, in particular to the implementation of a system for tracking and monitoring execution, or debugging, of applets installed on a microprocessor card.

BACKGROUND OF THE INVENTION

The methods for exchanging data or information between master and slave transceivers are currently of very considerable interest, in so far as the methods make it possible to effect a reliable and perfectly stable exchange of data, and hence of information, between a master element, endowed with considerable computational and processing capabilities, and a slave element, whose computational and processing capabilities, related to the storage capabilities, are currently much lower.

This is the case in particular for computer systems consisting of card reader (CAD)—microprocessor card, chip card, pairs also known as embedded systems, for which the ISO 7816 standard defines two protocols for communication between chip card and CAD reader.

More specifically, these two protocols are defined by the parameters T=0 and T=1 and each correspond to a "half-duplex" protocol, just one of the two participants, the card reader, respectively the chip card, being able at a given instant to transmit data to the other participant.

Following the insertion of the card into the card reader, the energy supply to the card is undertaken by the card reader and the data exchange thus occurs on a single physical channel, between the master transceiver, the CAD reader, and the slave transceiver, the chip card. The information unit transmitted is called an APDU standing for Application Protocol Data Unit.

In the aforesaid protocols, known from the prior art, one distinguishes between the command APDUs, or C-APDU, and the response APDUs or R-APDU.

An information exchange session consists of one or more APDU exchanges. Thus, an APDU exchange consists of an exchange of a C-APDU/R-APDU command/response pair, always initiated by the master transceiver element, which dispatches a C-APDU to which the slave transceiver responds through an R-APDU. For the duration of the exchange, the master element remains disabled, while awaiting the response, the exchanges of command/response pairs therefore involving the successive transfer of transmission initiative, control, between the master transceiver, respectively the slave transceiver, and vice versa.

In the worst case, the sole initiative, distinct from this successive transfer, that the master transceiver, the CAD reader, is liable to take is to interrupt the entire exchange session by cutting the power supply to the slave transceiver, the chip card.

Constant progress in the physical processes for etching integrated circuits and, consequently, in the capabilities for computation and for processing and for storage in a given volume or area of silicon have however prompted, recently, the appearance of slave transceivers, with multiple functionalities. This is the case in particular with multi-application chip cards. Certain chip cards may, for example, incorporate several applications with which the CAD reader can seek to communicate independently. Specifically, whereas CAD readers exhibit no prohibitive limitations of capacity, several applications may be installed in this type of CAD reader, such as for example, automatic ticket dispensers set up in banks or GSM mobile telephony terminals, the system consisting of a slave transceiver, multi-application chip card, is then confronted with the multiple exchange of information, by command/response pairs, on a single physical channel, between substantially independent applications.

Certain chip cards may in fact incorporate several file systems, several applets or services set up on the latter. GSM cards, in particular, serve, both to cater for the authentication of the subscriber, and, as portable unit, embedded system, for the execution of applets.

With this aim, section 5.5 of the ISO 7816-4 standard defines the concept of logical channel. These logical channels make it possible to decouple the sessions of APDU exchanges bound for the various participants, applets or services, present on the chip card. The standardized process proposed is very simple, a chip card being able to manage up to four logical channels numbered from 0 to 3. These logical channels may be opened respectively closed by the manage channel standard command, as defined in section 6.16 of the ISO 7816-4 standard. Next, the index number of the destination logical channel for a C-APDU command is coded in the two low-order bits of the class code (CLA) of the ADPU.

Thus, the various logical channels defined by the ISO 7816-4 standard are therefore logically decoupled, but the APDU exchanges on the single physical exchange channel remain disabling, both for the CAD reader and its various applications and also for the various applets or services which can be executed on the chip card, the conflict liable to be generated by the simultaneous multiple presence of command/response pairs relating to distinct logical channels not being resolved specifically. See in particular the provisions of paragraph 4, section 5.5.1 of the ISO 7816-4 standard, according to which the launching of command/response pairs must be terminated before the launching of the next command/response pair, the commands and the responses having not to be nested on several logical channels, a single logical channel having to be active between the reception of a command and the dispatching of the corresponding response.

SUMMARY OF THE INVENTION

The object of the present invention is to remedy the drawbacks of the protocols for exchanging data by command/response pairs of the prior art between master transceiver and slave transceiver by virtue of the elimination of the limitation imposed on the multiple logical channels.

Another object of the present invention is the formulation of a method for the transmission of a plurality of logical flows for multiple exchange of command/response pairs on a single physical exchange channel, between a master transceiver and a slave transceiver, by virtue of the implementation of concurrent logical channels, each concurrent logical channel allowing the independent exchanging of command/response pairs, it being possible however, for several command/response pairs to be active simultaneously on the various open concurrent logical channels.

In particular, another object of the present invention is the formulation of a method for the transmission of a plurality of logical flows for the multiple exchange of command/response pairs on a single physical exchange channel, between a master transceiver and a slave transceiver, in which the master transceiver, such as a CAD reader, is able to initiate an exchange of command/response pairs, APDU, on another concurrent logical channel, while an exchange of command/response pairs is already in progress on an already active concurrent channel, various applications connected to the master transceiver, the CAD reader, using at least one application managed by the slave transceiver, applet or service installed in the chip card, consequently being executed independently of one another, in the absence of any risk of conflict of execution.

Reciprocally, another object of the present invention is a method for the transmission of a plurality of logical flows for multiple exchange of command/response pairs on a single physical exchange channel, between a master transceiver and a slave transceiver, in which different command/response pairs can be exchanged on distinct concurrent logical channels linked to various applications managed by the slave transceiver, applications such as the various applets or services installed on a multi-application chip card, these applications, by virtue of the implementation of the method which is the subject of the present invention thus executing simultaneously and independently.

Another object of the present invention is also a method for the transmission of a plurality of logical flows for multiple exchange of command/response pairs on a single physical exchange channel, between a master transceiver and a slave transceiver, in which each of the concurrent logical channels is closed on the initiative solely of the master transceiver, including in the case of an exchange of command/response pairs in progress.

Another object of the present invention is also a method for the transmission of a plurality of logical flows for multiple exchange of command/response pairs on a single physical exchange channel, between a master transceiver and a slave transceiver exchanging command/response pairs on base logical channels, command/response pairs possibly also being exchanged on concurrent logical channels between this master transceiver and this slave transceiver, the command/response pairs constituting base logical flows conveyed by the base logical channels, respectively concurrent logical flows, conveyed by the concurrent logical channels, these logical flows cohabiting so as to benefit from the procedure for exchanging command/response pairs on the single physical exchange channel, in the absence of any conflict.

Another object of the present invention is finally, when the master transceiver consists of a CAD reader and the slave transceiver consists of a chip card, a method for the transmission of a plurality of logical flows for multiple exchange of command/response pairs which is fully compatible with the specifications of the ISO 7816 standard.

The method for the transmission of a plurality of logical flows for multiple exchange of command/response pairs on a single physical exchange channel between a master transceiver and a slave transceiver, the subject of the invention, pertains to logical flows comprising at least one base logical flow, initiated by the master transceiver, subject to the same master/slave relation as the single physical exchange channel, the master respectively slave transceiver allowing the execution of at least one software application.

It is noteworthy in that it consists in generating in the one of the base logical flows taken as reference logical flow, a set of concurrent logical flows, each concurrent logical flow being formed by successive elementary packets segmenting the command/response pairs. The successive elementary packets forming the set of concurrent logical flows are transmitted on the reference logical flow, two concurrent logical flows of this set allowing the independent and substantially simultaneous transmission of distinct command/response pairs.

The initiation and the continuation of any exchange of command/response pairs is carried out on the initiative of the master transceiver on the basis of specific commands transmitted on this reference logical flow and the segmentation into successive elementary packets being carried out on the initiative of specific responses transmitted in response to these specific commands on this reference flow. This allows, on the one hand, the exchange of independent and substantially simultaneous command/response pairs between at least one pair of applications of the master, respectively slave, transceiver, and, on the other hand, the exchange of priority command/response pairs on a different base logical flow from the logical flow taken as reference logical flow on the physical exchange channel.

BRIEF DESCRIPTION OF THE DRAWINGS

The method for the transmission of a plurality of logical flows for multiple exchange of command/response pairs on a single physical exchange channel between a master transceiver, respectively slave transceiver, and a system for tracking and monitoring execution of applets installed on a computer system, such as an embedded computer system implementing such a method, which are the subject of the present invention, will be better understood on reading the description and on looking at the drawings hereinbelow in which:

FIG. 2a represents, by way of illustration, a mode of implementation of an exchange on a base logical flow, taken as the case may be as reference logical flow;

FIG. 2b represents, by way of illustration, the procedure for chopping into successive packets an exchange by a concurrent logical flow on the initiative of the slave transceiver;

FIG. 4a represents a time chart of the exchanges carried out between the various elements of the computer system for tracking and monitoring applets, which is the subject of the present invention, as represented in FIGS. 3a, 3b in non-debugged mode, the debugging function not being activated, this system behaving substantially, in this case, as a CAD reader associated with a multi-application chip card of the prior art;

FIG. 4b represents a time chart of the exchanges carried out between the various elements of the computer system for tracking and monitoring the execution of applets, which is the subject of the present invention, as represented in FIGS. 3a, 3b in debugged mode, the debugging function being activated;

FIG. 4c represents a time chart of the exchanges carried out between the various elements of the computer system for tracking and monitoring applets, which is the subject of the present invention, as represented in FIGS. 3a, 3b and 4b when the virtual machine reaches a stopping point state, also known as Breakpoint hit.

DESCRIPTION OF PREFERRED EMBODIMENTS

A more detailed description of the protocol for the transmission of a plurality of logical flows for multiple exchange of command/response pairs on a single physical exchange channel, between a master transceiver and a slave transceiver, in accordance with the subject of the present invention, will now be given with FIG. 1a and the following figures.

Within the framework of the present description, it is recalled that a logical flow consists of an exchange of multiple command/response pairs on a logical channel by way of the single physical exchange link between master transceiver and slave transceiver.

Generally, it is recalled that the method, which is the subject of the present invention, can be implemented between any master transceiver and any slave transceiver which are linked by a half duplex link allowing the exchange of command/response pairs, the master transceiver being connected to one application from a set of applications and the slave transceiver allowing the execution of at least one application from a set of applications or of services. The interconnection of each application to the master transceiver, denoted E/RM, respectively to the slave transceiver, denoted E/RE, these applications being respectively denoted $AM_y$ for the application interconnected to the master transceiver and $AE_z$ for the application connected to the slave transceiver, can be carried out by way of a base logical flow, it being possible for this base logical flow to be transmitted by the single physical exchange channel, denoted SEPC, the aforesaid base logical flow BLF consisting of a transmission of command/response pairs, denoted $(C,R)_b$, on the single physical exchange channel SEPC.

Figure 1A:
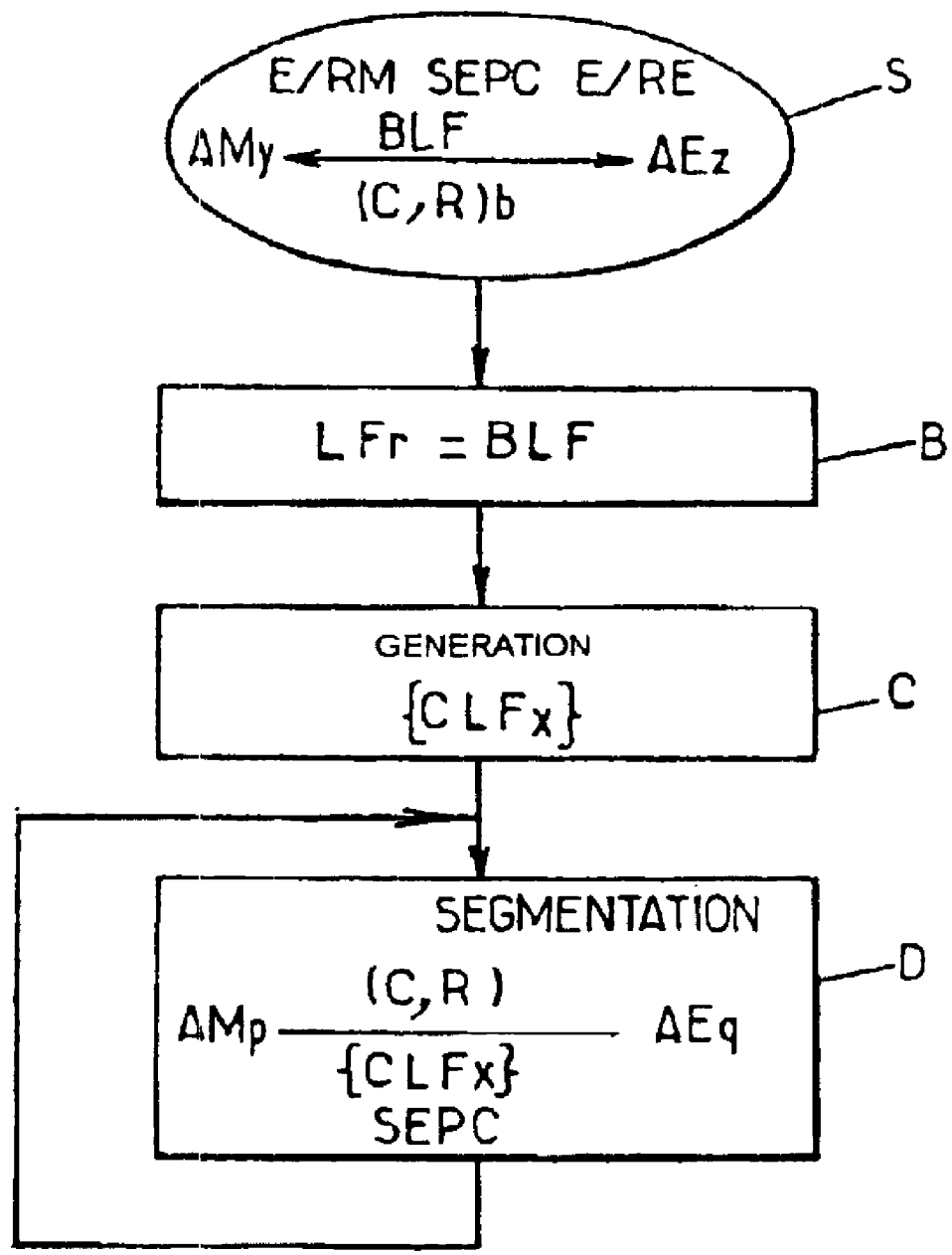
FIG. 1a represents, by way of illustration, a flow chart of the implementation of the essential steps of the protocol, which is the subject of the present invention, allowing execution of the protocol for the transmission of a plurality of logical flows for multiple exchange of command/response pairs on a single physical exchange channel between a master transceiver and a slave transceiver in the presence of a single base logical flow.

Under these conditions, a starting situation, denoted S, as represented in FIG. 1a is considered, in which the set of aforesaid parameters has been defined and can correspond in a nonlimiting manner to the situation in which the master transceiver E/RM is constituted by a CAD reader allowing the execution of at least one application and in which the slave transceiver E/RE is constituted by a chip card in which applets or services are installed, the base logical flows corresponding to the logical flows defined by the provisions of ISO standard 7816-3 and 7816-4 in this situation.

However, and in accordance with a first use according to the provisions of the aforesaid standard, a single base flow is considered as open and active within the framework of the implementation of the method, which is the subject of the present invention represented in FIG. 1a.

In a more specific manner, as represented in FIG. 1a, the method which is the subject of the present invention, consists in regarding the present active base logical flow BLF as reference logical flow $LF_r$. This operation is carried out in step B of FIG. 1a and illustrated by the relation:

$$LF_r = BLF.$$

This step can be performed by allocating a specific value, such as for example the hexadecimal value FE or the like, to the class codes or parameters of the present active base logical flow.

Step B is then followed by step C consisting in generating a set of concurrent logical flows $\{CLF_x\}$. Each concurrent logical flow is formed by successive elementary packets segmenting the command/response pairs. The successive elementary packets forming the set of concurrent logical flows $\{CLF_x\}$ are transmitted on the reference logical flow $LF_r$ while effecting the segmentation of step D, two concurrent logical flows of this set allowing the independent and substantially simultaneous transmission of distinct command/response pairs. The return arrow represented in step D illustrates the multiple exchange of successive packets arising from the segmentation.

The initiation and the continuation of any exchange of command/response pairs is carried out on the initiative of the master transceiver on the basis of specific commands transmitted on the reference logical flow and the segmentation into successive elementary packets is carried out on the initiative of the slave transceiver on the basis of specific responses transmitted in response to these specific commands on this reference flow. The master transceiver can thus maintain, either the exchange of distinct command/response pairs, by maintaining the reference logical flow $LF_r$ for the execution of an exchange between application and distinct applets, or the exchange of command/response pairs by return to the base logical flow, by withdrawal of the value FE.

This modus operandi allows the exchange of independent and substantially simultaneous command/response pairs between at least one pair of applications of the master, respectively slave transceiver, as will be described in greater detail later in the description. As far as the concept of substantially simultaneous transmission of distinct command/response pairs is concerned, it is of course understood that the concept of simultaneity is defined to within the duration of transmission of successive packets.

Figure 1B:
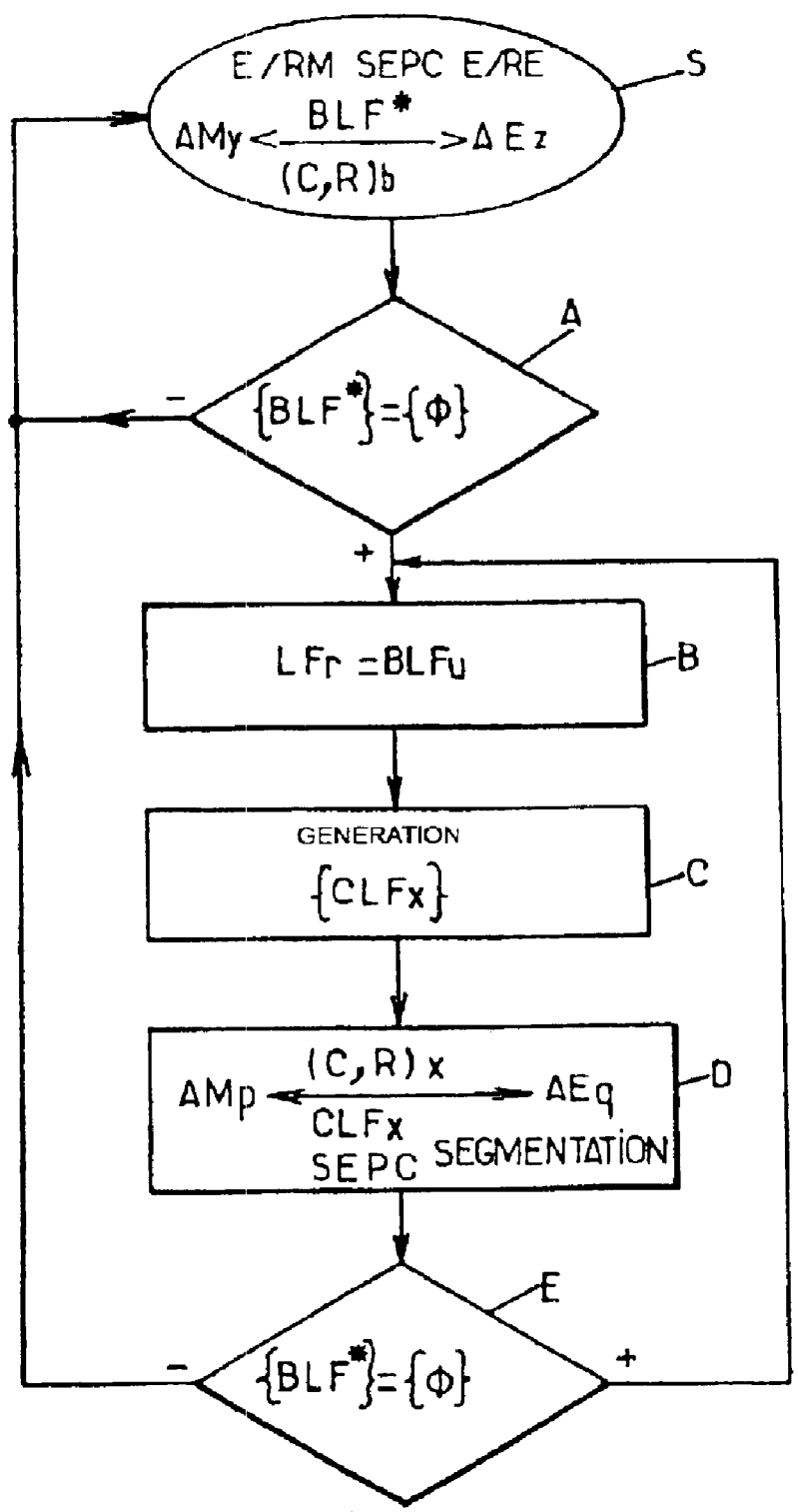
FIG. 1b represents, by way of illustration, a flow chart of the implementation of the essential steps of the protocol, which is the subject of the present invention, allowing the execution of the method for the transmission of a plurality of logical flows for multiple exchange of command/response pairs on a single physical exchange channel between a master transceiver and a slave transceiver in the presence of a plurality of base logical flows.

Furthermore, the method which is the subject of the present invention can be implemented in the presence of a plurality of active base logical flows. As represented in FIG. 1b, in this situation, during the presence of any base logical flow initiated by the master transceiver E/RM, this situation corresponding to a starting situation S similar to that of FIG. 1a, the method which is the subject of the present invention can consist in effecting the transmission of any open, and normally active, base logical flow between the master transceiver and the slave transceiver. This operation can be carried out by a test step A consisting in verifying the existence of an active base flow BLF* initialized on the initiative of the master transceiver, on request from any application $AM_y$ connected or liable to be connected to the master transceiver.

In FIG. 1b, the corresponding test A is denoted:

$$BLF^* = \{\Phi\}$$

This test consists in verifying the absence of any active base logical flow.

Upon a negative response to the aforesaid test A, an active base flow being present at the level of the master transceiver, the method which is the subject of the present invention consists in executing the transmission of the aforesaid active base logical flow by return to step S.

Conversely, on a positive response to the aforesaid test A, no active base flow being present at the level of the master transceiver, the method which is the subject of the present invention can then consist in generating, in at least one base flow taken as reference logical flow, a set of concurrent logical flows.

In FIG. 1b, step B, similar to that of FIG. 1a, represents the definition of a base logical flow $BLF_u$ as reference logical flow, denoted $LF_r$ by the relation:

$$LF_r = BLF_u$$

Within the framework of the implementation of the method which is the subject of the present invention, according to a protocol compatible with the provisions of the ISO standard 7816-4, the definition of the reference logical flow in step B can advantageously be performed by allocating the specific value, such as for example the hexadecimal value FE or the like mentioned previously, to the class codes or parameters of the relevant base logical flow.

Following step B, a set of concurrent logical flows is generated in step C, similar to that of FIG. 1a, each concurrent logical flow, denoted $CLF_x$, and the set of these concurrent logical flows, denoted $\{CLF_x\}$, is formed by successive elementary data packets, as will be described later in the description. The concurrent logical flows of the aforesaid set of concurrent logical flows $\{CLF_x\}$ allow the independent and substantially simultaneous transmission of distinct command/response pairs between applications connected to the master transceiver, applications denoted $AM_p$, respectively to the slave transceiver, applications denoted $AE_q$, it being possible for these applications to be a priori different or not different from the applications $AM_y$, respectively $AE_z$, for which an exchange of data has previously been performed by means of a base logical flow from the set BLF*.

In FIG. 1b, the step of independent and substantially simultaneous transmission of distinct command/response pairs is denoted D, these command/response pairs being denoted $(C,R)_x$ and transmitted according to the corresponding concurrent logical flow $CLF_x$ on the single physical exchange channel SEPC.

Furthermore, as represented in FIG. 1b, the method, which is the subject of the present invention, consists in suspending the exchange of any concurrent logical flow immediately upon the activation by the master transceiver E/RM for execution of the exchange of command/response pairs on a base logical flow distinct from the reference logical flow on the single physical exchange channel. This suspension operation can correspond to a test step E such as represented in FIG. 1b, this test step E possibly corresponding to the same test of verification of the absence of active base logical flow BLF* as carried out in step A.

On a negative response to the test step E, an active base logical flow initiated by the master transceiver E/RM being present, a return to the starting step S is carried out for execution of the transmission of this active base logical flow.

Conversely, on a positive response to the test E, a return is carried out to step B, for redefinition of a reference logical flow and, of course, execution of the multiple exchange process in accordance with steps B, C and D described above.

It is thus understood that, by virtue of the implementation of the successive steps of the method which is the subject of the present invention, as represented in FIG. 1b, said method makes it possible to continue the exchange of any concurrent logical flow immediately upon the end of the execution of the exchange of any base logical flow.

This modus operandi allows the exchange of independent and substantially simultaneous command/response pairs between at least one pair of applications of the master, respectively slave transceiver on the single physical exchange channel.

The method, which is the subject of the present invention, as represented in FIG. 1b, makes it possible to cater for conflict-free cohabitation, the concurrent logical channels allowing the transmission of the concurrent logical flows and the base logical channels allowing the transmission of the base logical flows. In particular it allows on the one hand, the exchange of independent and simultaneous command/response pairs, as mentioned above, between at least one pair of applications of the master, respectively slave transceiver, and, on the other hand, the exchange of priority command/response pairs on the base logical flows on the single physical exchange channel.

It is thus understood that, when, as will be described hereinbelow, the base logical flows are defined in such a way as to satisfy the provisions of ISO standard 7816-4 and when the master transceiver is constituted by a CAD reader, whereas the slave transceiver is constituted by a chip card, at any moment, the CAD reader is able to initiate an exchange of APDU commands on a base logical channel. For the duration of this exchange, the other channels, concurrent or otherwise, are then suspended, although without the exchanges currently in progress on the concurrent channels being interrupted.

In the aforesaid specific implementation, it is then advantageous to use the base logical flows and channels to cater for the transmission of the command/response pairs whose processing requires only a relatively short time.

A more detailed description of a specific implementation of steps B, C and D of the method, which is the subject of the present invention, such as were previously described in conjunction with FIGS. 1a, 1b will now be given with reference to FIGS. 2a, 2b, 2c and 2d when, in particular, the aforesaid base logical flows $BLF_u$ satisfy the provisions of ISO standard 7816-4.

Represented in FIG. 2a are a master transceiver and a slave transceiver, which will be designated as element E/RM respectively element E/RE.

The exchange of a command/response pair, denoted (C,R), on a base logical flow $BLF_u$, is performed on the single physical exchange channel SEPC, the element E/RM receiving a command C from the application $AM_p$ connected to the element E/RM, by way of the pilot P, this element taking control in order to effect the transmission of the command C, denoted C=["COMMAND"], to the slave element E/RE. The element E/RE having control, transmits the command C to the application $AE_q$ connected to the slave element E/RE. The response of the aforesaid application R is communicated to the slave element E/RE, which again has control so as to effect the transmission of the response, denoted R=["RESPONSE"], on the single physical exchange channel SEPC to the element E/RM, which transmits it to the application $AM_p$ by way of the pilot P. In the given example, it is understood that the character strings "COMMAND" and "RESPONSE" designate a symbolic command and a symbolic response respectively.

When the relevant logical flow is a base logical flow $BLF_u$, the command/response process can be continued with the execution of the corresponding commands and responses, in the absence of nesting or interleaving of the successive corresponding logical flows, in accordance with the provisions of ISO standard 7816-4.

Conversely, when the base logical flow is constituted as reference logical flow $LF_r$, by allocating the specific class code mentioned previously in the description for example, the process for generating the successive concurrent logical flows is then carried out on the initiative of the slave element E/RE by a chopping of the data constituting an exchange of APDU on the relevant concurrent logical channel. This chopping consists of a chopping into more elementary data units or segments and of the transmission of these data or command segments, on the single physical exchange channel SEPC using ordinary APDUs however.

It is understood in particular that the aforesaid chopping on the initiative of the slave element E/RE can advantageously be performed in accordance with a particularly noteworthy aspect of the method, which is the subject of the present invention, by the definition, on the initiative of the element E/RE by means of a response, of a segmentation order. This segmentation order can for example define the maximum size of the packet of the command transmitted by the master element E/RM in the guise of partial command or data item. The slave element E/RE defines on its own initiative or on request from the application $AE_q$ the maximum size of the packet transmitted in the guise of partial command dispatched by the aforesaid master element E/RM. Reciprocally, the slave element defines the actual size of the packet transmitted in the guise of partial response. It is understood in particular that the chopping of the aforesaid data into data segments or packets makes it possible to interleave these partial APDUs and thus interleave the data logical flows, concurrent logical flows flowing on the concurrent logical flows and the aforesaid concurrent channels.

An example of segmentation or chopping into successive packets of a command, respectively of a response constituting a command/response pair exchanged between an application $AM_p$ connected to the master element E/RM and an application $AE_q$ connected to the slave element E/RE by way of a concurrent logical flow $CLF_x$ will be given, by way of nonlimiting example, in conjunction with FIG. 2b.

In the aforesaid figure, it is indicated that the command/response pairs used correspond of course, in the aforesaid nonlimiting embodiment, to APDU commands.

Thus, the application $AM_p$ transmits a command C to the master element E/RM, this command being denoted:

C=["COMMAND"]

In the aforesaid command, constituting a C-APDU, the character string "COMMAND" representing a symbolic command designates any command, normally available in the guise of APDU command. The logical value of this command is that which is normally available in the collection of APDU commands, the aforesaid character string simply symbolizing the syntax of this command.

On receipt of the aforesaid command C by the master element E/RM, the latter having control, transmits to the slave element E/RE a specific command for notification of command to the slave element E/RE.

The command notification command is denoted:

[COMMAND_READY x]

where x designates the index of $CLF_x$.

On receipt of the aforesaid command notification, the slave element E/RE, in conjunction with the application $AE_q$ and having control, transmits a response constituting an order for segmentation of the command to be received, the command C cited above.

The segmentation order is a response of APDU type of the form:

[RECEIVE_BYTES x NB=3]

The response, the aforesaid segmentation order, of course comprises, in addition to the functional header RECEIVE_BYTES, a field relating to the concurrent flow of index x and a field, designated arbitrarily in FIG. 2b by NB=3 where NB denotes the maximum number of bytes or words (characters) which is requested by the slave element E/RE in conjunction with the application $AE_q$ connected to said element.

On receipt by the master element E/RM of the segmentation order, the master element E/RM again having control, transmits on the reference logical flow $LF_r$, a data transmission command comprising of course the number of bytes or words which is requested by the slave element E/RE or a lower number.

The packet transmission command is an APDU command of the form:

[SEND_DATA x ["COM"]]

In addition to the functional header SEND-DATA corresponding to a data transmission command and the field relating to the concurrent logical flow of index x which is the subject of the present invention, this packet transmission command of course comprises a number of bytes, or words, equal to three and corresponding, in the case of the command C, to the first three letters COM of the arbitrary command "COMMAND".

Following the receipt by the slave element E/RE of the aforesaid packet transmission command, the slave element having control transmits an APDU type acknowledgement of receipt response designated [OK] in FIG. 2b to the master element.

The master element E/RM again having control, then transmits to the slave element E/RE a command for continuance of transmission of the exchange of command/response pair of the form:

[RESUME]

On receipt of this continuation command, the slave element E/RE having control, repeats, after processing by the application $AE_q$, the dispatching to the master element of the segmentation order response in which, for example, the field relating to the requested number of bytes is taken equal to NB=4.

Following the receipt by the master element E/RM of the aforesaid new segmentation command, said element transmits a new command for transmission of a packet, in which command the field of the packet transmitted comprises 4 bytes corresponding to the letters "MAND" of the aforesaid command C.

Following the receipt of the aforesaid new packet of 4 bytes, the slave element E/RE is then ready, in conjunction of course with the application $AE_q$ and having control, to transmit a segmented response of APDU type and of the form:

[SEND_BYTES×["RESP"]]

The aforesaid response comprises a number of transmitted bytes or words whose choice is at the sole initiative of the slave element E/RE, in conjunction with the application $AE_q$ connected to said element. In the case of FIG. 2b, the segmented response comprises 4 bytes, or words, that is to say four letters "RESP" corresponding to the first segment of a symbolic response, "RESPONSE".

Following the receipt by the master element E/RM of the aforesaid segmented response, the latter element, having control, then transmits a new continuation command to the slave element E/RE, thereby allowing the slave element E/RE, in conjunction with the application $AE_q$ and having control, to dispatch to the master element E/RM a new segmented response comprising a number NB of transmitted bytes or words taken arbitrarily equal to four and corresponding to "ONSE".

On receipt of this new segmented response, the master element E/RM in fact transmits a continuation command to the slave element E/RE so as to allow the full transmission of the response until an APDU type end of response message is transmitted by the slave element E/RE to the master element E/RM.

The end of response APDU message is of the form:

[RESPONSE_COMPLETE x]

Following the receipt of the end of response message, the master element E/RM has the complete response R of the form:

R=["RESPONSE"]

and corresponding therefore to the symbolic response, the command/response pair C/R having been transmitted by way of the concurrent logical flow $CLF_x$, on the single physical exchange channel SEPC, in successive packets on the initiative of the slave element E/RE.

The segmentation of the commands and responses transmitted by the concurrent logical flows into packets is thus carried out under the supervision of the slave element, that is to say of the chip card itself, in conjunction with the recipient of the transmitted data, that is to say the applets for example.

This modus operandi appears extremely important insofar as it makes it possible to use all the transport protocols defined by the ISO 7816-4 standard, in particular for the value of the transport parameter T=0, for which the exact form of the APDU, in particular its direction, is ambiguous and constitutes an implicit information element known only to the two parties communicating on the single physical exchange channel, that is to say, at the end of the day, the applications $AM_p$ and $AE_q$.

Furthermore, the aforesaid segmentation process, in which the slave element E/RE regularly cedes control to the master element, the CAD reader, makes it possible to manage any asynchronous requests for exchange originating from the applications $AM_p$ or $AE_q$ connected to the various concurrent channels.

As far as the aforesaid segmentation process is concerned, and of course as far as the process for implementing the method, which is the subject of the invention, as represented in FIG. 1, is concerned, it is indicated that the applications $AM_p$ and $AE_q$ can request the opening of a concurrent channel for transmission of a concurrent logical flow or of a base channel for the transmission of a base logical flow by way of the pilot, not represented in the drawing, which consists of a specific computation unit. The pilot can of course communicate with the master element E/RM and with the applications $AM_p$. Each application can moreover, following the opening of a concurrent channel or of a base channel for the exchange of a concurrent logical flow respectively of a base logical flow, request the exchange of an APDU on this channel and interrupt the current exchange in the case where the channel is concurrent or where the logical flow exchanged is a concurrent logical flow, as represented in FIG. 1.

Figure 2C:
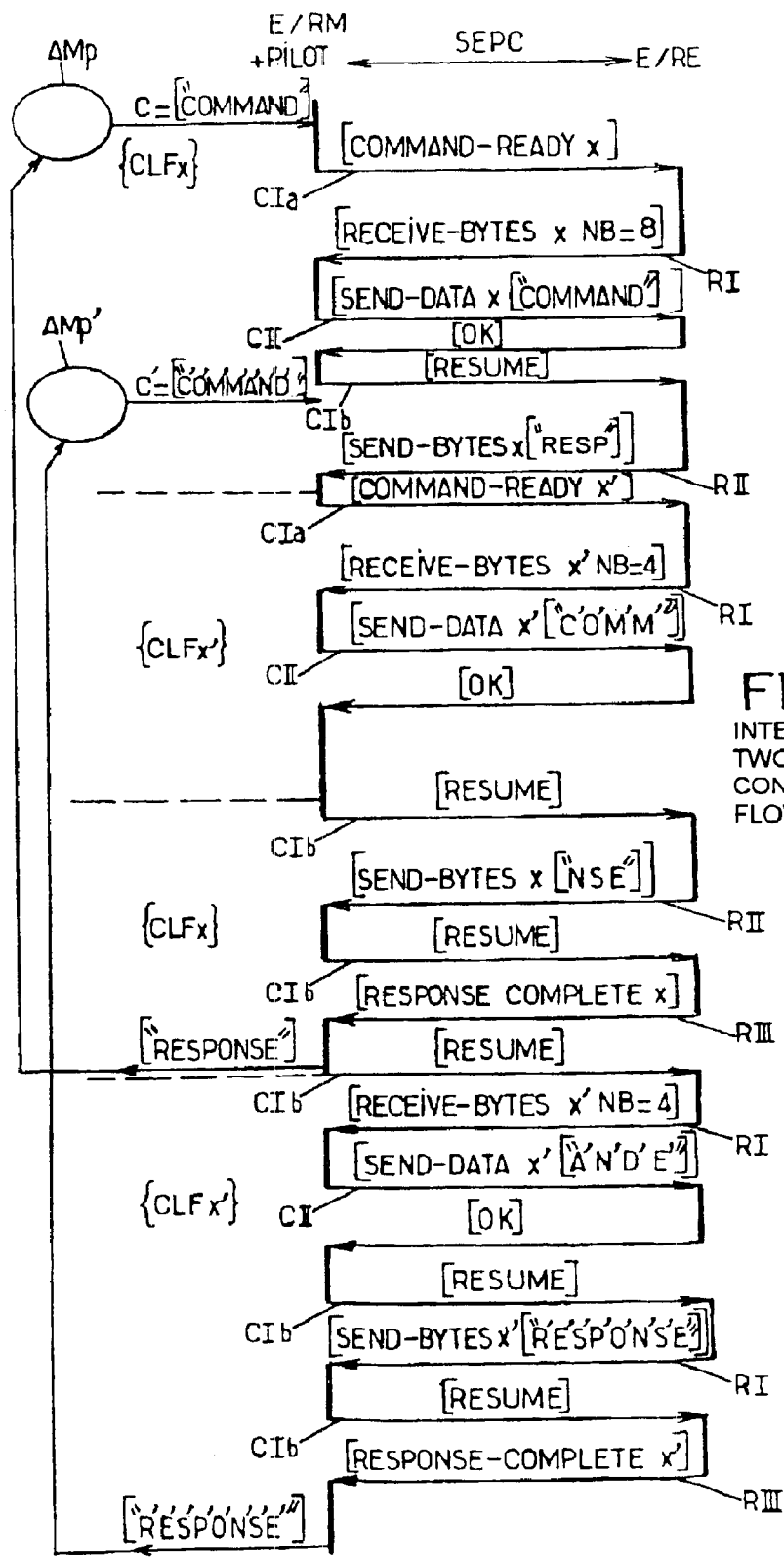
FIG. 2c represents, by way of illustration, an interleaving of the successive packets of two exchanges by two distinct concurrent logical flows between the master transceiver and the slave transceiver, the chopping of each of the concurrent flows into successive packets being performed on the initiative of the slave transceiver in the same manner as in the case of FIG. 2b.

Moreover, the segmentation of the data or commands constituting an exchange of APDU on a concurrent channel, as represented in FIGS. 1 and 2b, allows the transmission of these data or command segments on the single physical exchange channel, while authorizing the interleaving of the command/response pairs constituted by elementary APDUs, and, ultimately, the corresponding interleaving of the concurrent data flows flowing on the aforesaid concurrent channels, as will be described in a specific nonlimiting example, in conjunction with FIG. 2c.

In the aforesaid FIG. 2c, there is considered a nonlimiting example in which two applications $AM_p$ and $AM_{p'}$ can be connected to the master element E/RM by way of the pilot, whereas the slave element E/RE is connected to a single application for example, which, for this reason, is not designated as such in FIG. 2c.

In the aforesaid figure, the application $AE_y$, by way of the pilot, not represented, supposedly dispatches a command C=["COMMAND"] to the master element E/RM following the request of opening of a concurrent logical flow $CLF_x$.

With reference to FIG. 2b, the master element E/RM transmits the command notification command mentioned previously in the description on the single physical exchange channel SEPC. The slave element E/RE responds through transmission of a segmentation order response for which NB is taken equal to 8 arbitrarily by the applet or application executed by the slave element E/RE.

On receipt of the segmentation order response by the master element E/RM, the latter transmits to the slave element E/RE a packet transmission command, comprising a character string comprising eight characters corresponding to the number of bytes or words requested by the slave element, the symbolic command thus being transmitted in full. The slave element E/RE is then able to transmit the acknowledgement of receipt command [OK] to the master element. The master element can then continue any transmission procedure, either on the concurrent logical channel through the transmission of the concurrent logical flow $CLF_{x'}$ or on another concurrent logical channel, as will be described hereinbelow.

The application $AM_p$, executed by the master element E/RM has requested the opening of a concurrent logical channel $CLF_{x'}$ prior to the transmission by way of the pilot of a command C', corresponding to the symbolic command of the form:

C'=["C'O'M'M'A'N'D'"]

On receipt of the continuation command dispatched by the master element E/RM to the slave element E/RE, the latter can then proceed to the dispatching of a segmented response corresponding to the command C, since, of course, the slave element E/RE does not yet know of the existence of the command C' for which, alone, the concurrent logical channel has been opened, the corresponding concurrent logical flow $CLF_{x'}$ not yet being active.

By way of nonlimiting example, and for a symbolic response "RESPONSE", the segmented response transmits a packet by way of partial response, consisting of the character string "RESP".

The master element E/RM can then proceed, by way of the pilot, to the activation of the concurrent logical flow $CLF_{x'}$ so as to initialize a nested exchange through the dispatching of the command notification command relating to the command C' mentioned previously.

On receipt of the command notification command by the slave element E/RE, the latter having control, transmits a segmentation order response relating to the command C' for a number of bytes which is arbitrarily taken equal to NB=4. In response, the master element E/RM transmits a packet transmission command relating to the command of C' and comprising of course 4 bytes, or characters, these letters constituting the character string "C'O'M'M'" of the symbolic command C'.

The slave element E/RE transmits the acknowledgement of receipt in response.

The master element E/RM having control, can, by way of the pilot, notify the slave element E/RE of the set of the currently active concurrent logical flows, when this set is different from the empty set. This notification can be performed in the form of a continuation command, which will be described in greater detail later in the description. In response to the continuation command, the slave element E/RE can then transmit the four missing bytes so as to effect the transmission of the symbolic response "RESPONSE", by the segmented response comprising the bytes, or words, "ONSE" on the concurrent logical stream $CLF_{x'}$. The master element E/RM then transmits on the same concurrent logical channel a continuation command to the slave element E/RE, which can then send an end of response command relating to the command C. On receipt of this end of message command, the master element E/RM can send the symbolic response to the command C to the application $AM_p$ by way of the pilot.

Moreover, the master element E/RM can then continue, by way of the pilot, the multiple exchange process on the concurrent logical flow $CLF_{x'}$ for the command/response pairs exchange relating to the command C', for which the end of response command has not yet been sent by the slave element E/RE. The concurrent logical flow $CLF_{x'}$ opened on the initiative of the application $AM_p$, is again activated by the pilot and, following the receipt of the continuation command by the slave element E/RE, the latter can transmit a segmentation order response to the master element E/RM for a maximum given number of bytes or words taken equal to NB=4 and relating to the command C' initialized by the application $AM_{p'}$.

On receipt of the segmentation order response, the master element E/RM can then transmit a packet transmission command relating to the command C' and comprising a packet consisting of 3 bytes, the last three bytes or words constituting the character string "A'N'D'" of the symbolic command C'.

Following the receipt by the slave element E/RE of the aforesaid packet transmission command and the dispatching by said element of an acknowledgement of receipt, the master element transmits a continuation command so as to obtain a response to the symbolic command.

In response to this continuation command, the slave element E/RE transmits the entire symbolic response, symbolic response denoted "R'E'S'P'O'N'S'E'" and corresponding to the response to the command C' in segmented response form.

Following the receipt of the aforesaid segmented response by the master element E/RM, the latter again transmits a continuation command to the slave element E/RE, which can then transmit an end of response command relating to the command C' to the master element E/RM. The latter can then proceed to the transmission to the application $AE_{y'}$ of the symbolic response formed by the character string ["R'E'S'P'O'N'S'E'"].

As far as the procedures for opening concurrent channels by way of the pilot are concerned, it is indicated that this opening can be carried out by way of an APDU command, of Manage Channel type. See ISO 7816-4 paragraph 6.16.

In general, it is indicated that each successive elementary packet, forming concurrent logical flows, is transmitted by means of specific APDU command/response pairs on the single physical exchange channel.

Command/response pairs for executing a base logical flow are constituted by the APDU entities and the distinct command/response pairs are formed preferably by a specific APDU command of Envelope type, and a short APDU response belonging to a subset of APDU responses.

On receipt of the special physical C-APDU commands of Envelope type, the slave element E/RE performs a processing. For example, the slave element, when the latter is constituted by a chip card, can progress the execution of certain installed applets. It must however, give a response in a relatively short time. The response constituting an R-APDU must take one of the following forms:

1. [TIME_OUT]
   the card has simply run out of the time granted without any other particular event;
2. [GET_HEADER x]
   the card demands the header of the C-APDU of concurrent channel x. The pilot must respond through the physical command [SEND_HEADER×CLA INS P1 P2 P3] to which the card responds through an R-APDU [OK];
3. [GET_BYTES x n]
   the card demands the next n bytes of the C-APDU of concurrent channel x. The pilot responds through a physical command [SEND_DATA x $a_1 \ldots a_m$] where $m \leq n$ may be different from n if this is the last segment of incoming data. The card acknowledges receipt through an R-APDU [OK];
4. [SET_OUTGOING_LENGTH x Lr]
   the card indicates to the pilot the length of the response R-APDU on concurrent channel x.

5. [SEND_BYTES x a$_1$ ... a$_n$]

the card dispatches the next n bytes of the R-APDU on concurrent channel x.

6. [STATUS x SW]

the card indicates the status, that is to say the last two bytes, of the R-APDU on concurrent channel x. The exchange on channel x is then terminated.

In all cases, the pilot retakes control after this exchange.

In the case where the request of the card constitutes a protocol error, for example in cases 2 to 6 if no exchange is in progress on channel x or else if the card requests the header twice in the course of one and the same exchange, the pilot signals the problem to the card through a command [IO_ERROR x code] where the nature of the error is expressed in the code number.

Figure 2D:
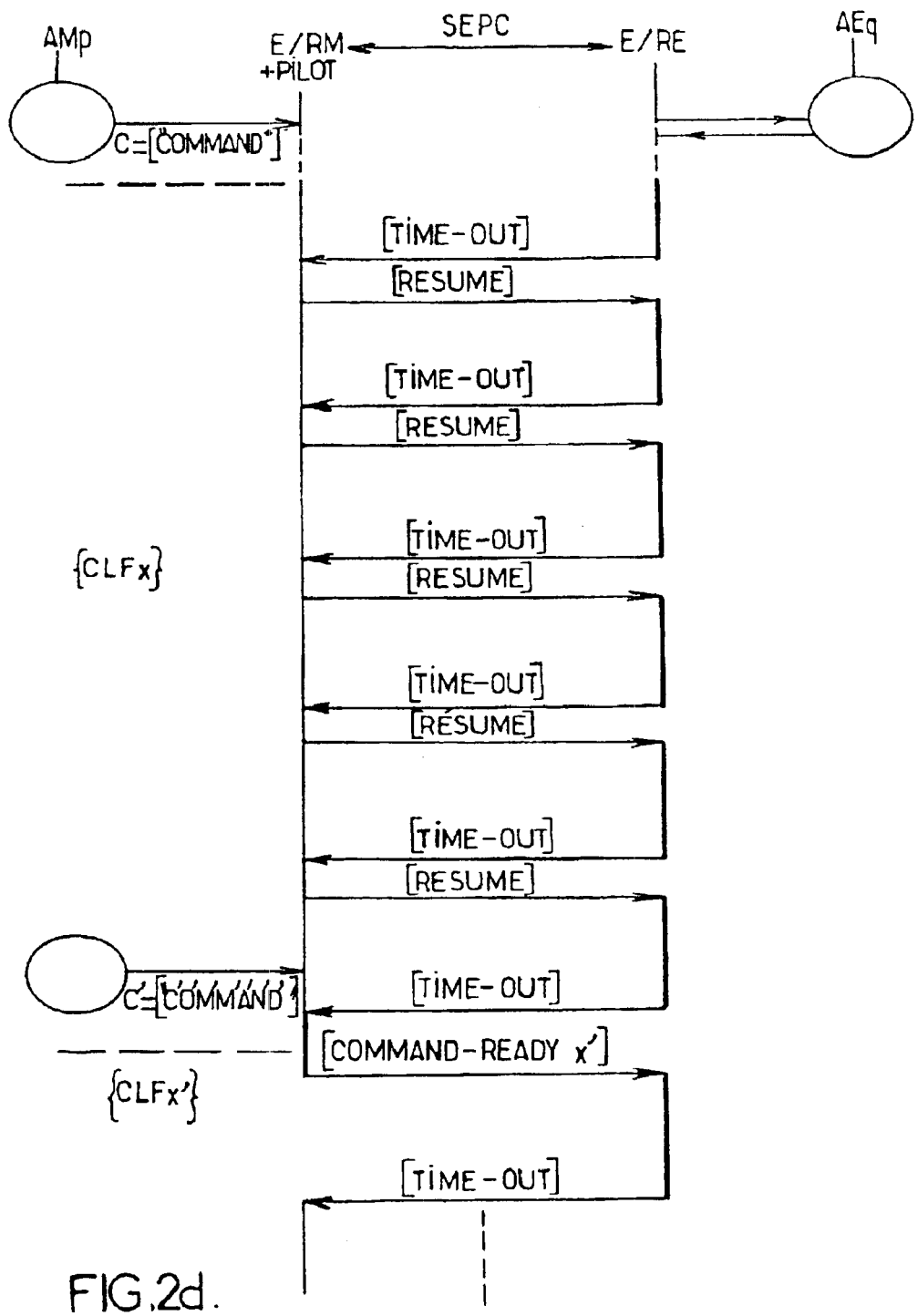
FIG. 2d represents, by way of illustration, a procedure for processing an exchange by concurrent logical flow during the procedure for long processing of another exchange by concurrent logical flow.

A specific processing of a request for exchange by concurrent logical flow during the long processing of another exchange by concurrent logical flow is moreover illustrated in FIG. 2d, relating to two applications AM$_p$ and AM$_{p'}$ executed by way of the master element E/RM.

With reference to FIG. 2d, there is considered the execution of the exchange of a command/response pair on a concurrent logical flow CLF$_x$ for a command C=[COMMAND"] executed on the initiative of the application AE$_y$.

In such a case, following the opening of concurrent logical flow CLF$_x$, this concurrent logical flow being rendered active by the pilot, the execution of the exchanges can be carried out under condition of execution within the time granted to the slave element E/RE.

For the execution of the exchange, any partial execution of the slave element E/RE running out of the time granted to the latter without any other particular event forms the subject of the dispatching by the slave element E/RE of a response of R-APDU type of the form:

[TIME_OUT]

and of the dispatching of a continuation command by the master element E/RM. This process can be continued for the active concurrent logical flow CLF$_x$ for various successive time slices used by the slave element E/RE.

On receipt by the master element E/RM of a command C' on the initiative of another application AM$_{p'}$, the opening of the concurrent logical flow CLF$_{x'}$, this concurrent logical flow being rendered active by the pilot, allows the transmission of a command notification relating to the command C' on the concurrent logical channel supporting the concurrent logical flow CLF$_{x'}$ to the slave element E/RE. The process for transmitting a response [TIME_OUT] can then be continued for the execution of the command C' on the concurrent logical flow CLF$_{x'}$ for the execution of the transmission of commands C, respectively C'.

The method, which is the subject of the present invention, allows the processing of asynchronous requests for exchange between applications executed by way of the master element E/RM as well as those of the applets or services executed by way of the slave element E/RE.

With reference to FIG. 1b, when these requests relate to the base logical flows and the corresponding base logical channels, in this case, the set of concurrent logical channels and concurrent logical flows is suspended until the receipt of the response relating to the base logical flows.

However, asynchronous requests for exchange may also relate to the dispatching of a C-APDU command on a free concurrent channel. In this case, the pilot, by way of the master element E/RM dispatches a command notification command to indicate that a C-APDU type command is available on the logical channel and the relevant concurrent logical flow CLF$_x$. The notification command can, by way of nonlimiting example, then trigger the execution of the recipient applet on the slave element E/RE.

When the pilot has control, by way of the master element E/RM, but no asynchronous exchange request is arriving at said element, although, however, an exchange is still in progress on one of the concurrent channels, the continuation of execution is carried out through the dispatching of a C-APDU type command, that is to say through the continuation command previously mentioned in the description.

Under these conditions, the slave element E/RE must cede control within a relatively short time, so as to be able to process the asynchronous requests as fast as possible.

Ultimately, with reference to FIGS. 1 and 2b, the method, which is the subject of the present invention, can, preferably, be implemented on the basis of two specific commands, commands of the C-APDU type, and three specific responses, of R-APDU type.

The first specific command consists of the command notification command, allowing the master element E/RM to notify the slave element E/RE of the existence of the set of currently active concurrent logical flows. It is understood that in the examples given in FIGS. 2b and 2c in particular, each command notification command comprised a single active concurrent logical flow, CLF$_x$ respectively CLF$_{x'}$, so as not to needlessly overburden the description, but that several concurrent logical flows may as appropriate be active simultaneously, the transmission on the single physical exchange channel of the concurrent logical flows not however, being executable other than successively.

The command notification command can in fact consist of:

the command CI$_a$ formed by the command [COMMAND_READY x];

the command CI$_b$ formed by the command [RESUME];

The commands CI$_a$ and CI$_b$ make it possible to notify the slave element E/RE of the availability of the master element E/RM for the execution or the continuation of an exchange on a concurrent channel.

The second specific command, consisting of the packet transmission command, makes it possible to dispatch from the master transceiver to the slave transceiver, an elementary packet. This second specific command, denoted C$_{II}$ is dispatched on receipt of the first specific response, denoted R$_I$, constituting the segmentation order, dispatched by the slave transceiver in response to one of the first or second specific commands. The second specific command C$_{II}$ is dispatched, on receipt of the first specific response emanating from the slave element E/RE, to one of the first C$_{Ia}$, C$_{Ib}$, respectively second C$_{II}$ specific commands, and makes it possible to transmit, from the master element E/RM to the slave element E/RE, an elementary packet relating to the currently active command for one of the concurrent logical flows of the set of concurrent logical flows, which is designated in the first specific response R$_I$. The chopping of the currently active command into successive packets, the command C in FIG. 2b, for example, is carried out on the initiative of the slave transceiver by specification in the first specific response R$_I$, constituting the segmentation order of the maximum size of the packet transmitted in the second specific command C$_{II}$.

The second specific response R$_{II}$ constituting the segmented response makes it possible to dispatch from the slave element E/RE to the master element E/RM an elementary packet of the response on a currently active concurrent logical flow, which is designated in the second specific response R$_{II}$ Finally, the third specific response $R_{II}$ consists of a simple response, the end of specific command/response pair response sent from the slave element E/RE to the master element E/RM.

Thus, the continuation of the exchange of successive packets is carried out on the initiative of the master element E/RM on dispatch by the latter of the first specific command, and in particular the command notification command $C_{Ia}$. This continuation is, however, conditioned on the absence of any active base logical flow as represented in FIG. 1b.

Conversely, the existence of an active base logical flow conditions the priority transmission of this active base logical flow on the single physical exchange channel by the master element E/RM, as represented in FIG. 1b.

The set of steps of the method, which is the subject of the present invention, allows the exchange of independent command/response pairs, the response pairs C,R, respectively C',R', as illustrated in FIG. 2c.

A more detailed description of a system for tracking and monitoring execution of applets installed on a computer system, such as an embedded computer system, furnished with at least one memory, with an execution automaton and with an operating system, one at least of the installed applets being intended for exchanging specific information with at least one application executed by computer furnished with another operating system, will now be given in conjunction with FIGS. 3a, 3b and the following figures.

In a general manner, it is indicated that the system for tracking and monitoring execution of applets, in accordance with the subject of the present invention, implements the method for transmission of a plurality of logical flows for multiple exchange of command/response pairs on a single physical exchange channel between a the master element E/RM and a the slave element E/RE described previously, so as to cater for a process for tracking and monitoring execution of applets, that is to say for debugging the latter.

Figure 3A:
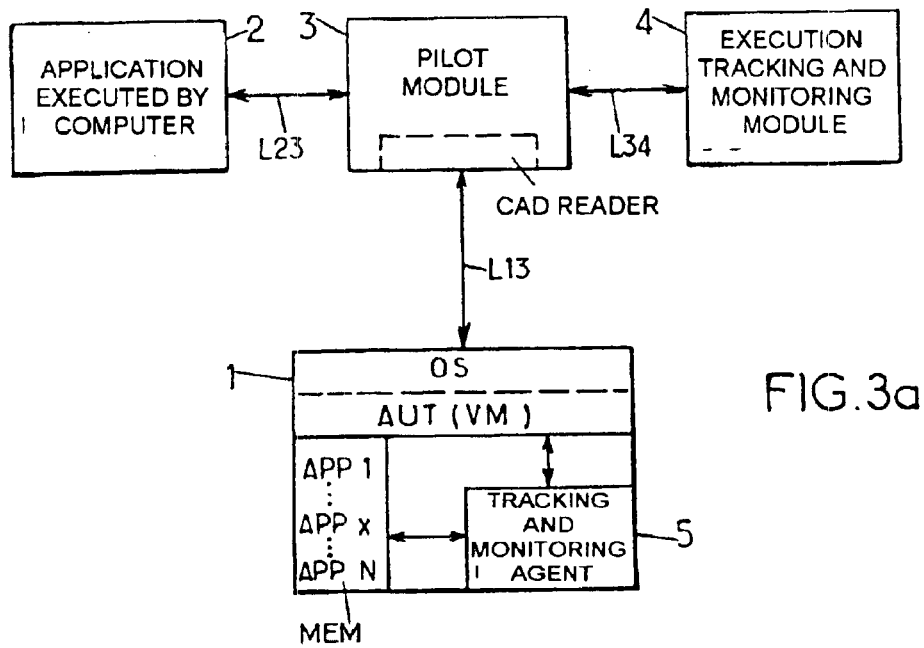
FIG. 3a represents a functional diagram of a computer system for tracking and monitoring execution of applets installed on an embedded computer system implementing the method for the transmission of a plurality of logical flows for multiple exchange of command/response pairs on a single physical exchange channel between a master transceiver and a slave transceiver, which is the subject of the present invention, the master transceiver element being constituted by a pilot module and a CAD terminal and the slave transceiver element being constituted by this embedded computer system, such as a chip card, the single physical exchange channel consisting of a link satisfying one of the ISO 7816 protocols.

As represented in the aforesaid FIG. 3a, the system which is the subject of the present invention comprises at least, in addition to the embedded computer system, constituted for example by a chip card 1, and the application 2 executed by a computer furnished with a specific operating system, a pilot module 3 for tracking and monitoring execution, that is to say for debugging, any applet installed on the embedded computer system 1. The pilot module 3 is on the one hand, linked to the application 2 by a link denoted $L_{23}$ and, on the other hand by way of a single physical exchange link of command/response type, link denoted $L_{13}$ to the embedded computer system 1.

The execution tracking and monitoring system, which is the subject of the present invention, also comprises an execution tracking and monitoring module 4 interconnected to the pilot module 3 by way of a link $L_{34}$, this execution tracking and monitoring module being intended to monitor the execution of the execution automaton of the embedded computer system 1.

More specifically, it is indicated that the embedded computer system 1 comprises an operation system OS, an execution automaton, denoted AUT, which, in a specific embodiment in the JAVACARD environment, may be constituted by a virtual machine VM of JCVM type for example.

Of course, the embedded computer system 1 comprises, installed in a nonvolatile memory, distinct applets, denoted $App_1 \ldots App_x \ldots App_N$, these applets being a priori independent.

Finally, the embedded computer system 1 comprises an agent module for tracking and monitoring execution of the execution automaton installed in nonvolatile memory of the embedded computer system 1.

In an especially advantageous nonlimiting embodiment, it is indicated that the embedded computer system 1 is an embedded system constituted by a chip card, or microprocessor, the pilot module 3 comprising a CAD reader with microprocessor and the single physical exchange link of command/response type, constituted by the link $L_{13}$ is constituted by an ISO 7816 type link.

More specifically, it is indicated that the single physical exchange link of command/response type, makes it possible to perform multiple exchanges, in accordance with the protocol, described previously in the description, which is the subject of the present invention.

As far as the links $L_{23}$ and $L_{34}$ are concerned, it is indicated that the link $L_{23}$ can be embodied as an ISO 7816 type link or as a software layer compatible with the software libraries PC/SC, or OCF for example. The software libraries PS/SC form the subject of the reference documents *Interoperability Specification for ICCs and Personal Computer Systems*, version 1.0, December 1997, parts 1 to 8 published by PC/SC Workgroup and accessible at the address [www.pcsworkgroup.com], and the OCF (OpenCard Framework) software libraries of a reference document Opencard Framework 1.1.1 . . . *Programmer's Guide, 3rd Edition,* April 1999, published by OpenCard Consortium and available at the address [www.opencard.org]. However, in the case of the implementation of the link $L_{34}$, this link may advantageously be embodied by means of the JDWP protocol specified by SUN MICROSYSTEMS INC. in the document JAVA™ *Debug Wire Protocol* accessible at the address [http://java.sun.com/products/jpda/doc/jdwp-spec.html] and delivered together with the "Java2SDK, v 1.3.0" software by SUN. The implementation of such a protocol makes it possible to use any execution tracking and monitoring tool adapted to this protocol.

Figure 3B:
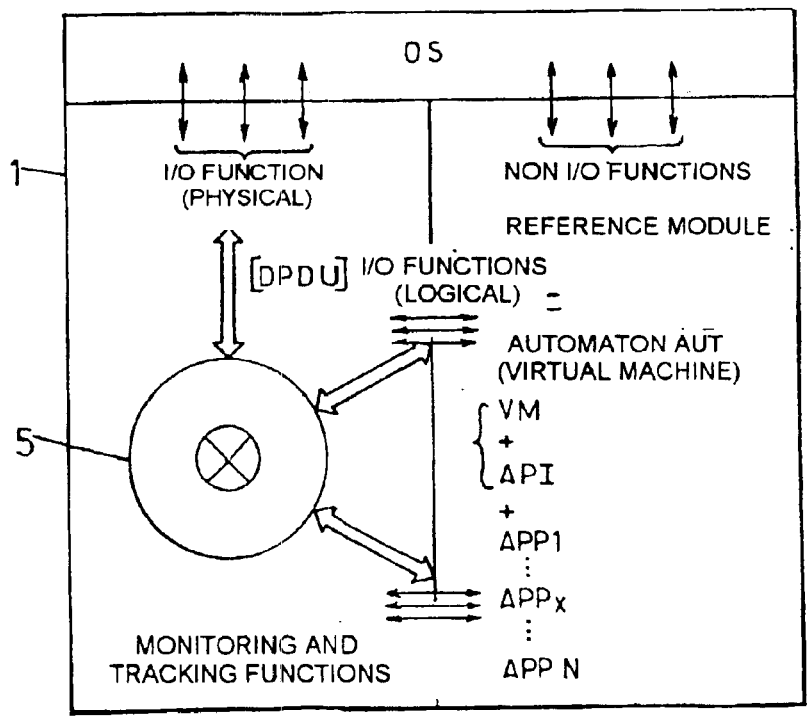
FIG. 3b represents, by way of illustration, a diagram of the logical links between a specific agent module for tracking and monitoring execution of the execution automaton installed in the embedded computer system, the operating system of this embedded computing system, the input/output functions (logical I/O functions constituted by APDUS), the functions for monitoring and tracking execution of the execution automaton, when, in a nonlimiting embodiment, the execution automaton is constituted by a virtual machine with which an applications interfacing library (API) is associated.

Moreover, as represented in FIG. 3b, the execution automaton AUT can comprise a virtual machine, denoted VM, with which is associated an application interfacing library API.

Finally, the agent module 5, installed in the nonvolatile memory of the embedded computer system, comprises a software agent module for tracking and monitoring execution of the exchange between the applications and applets.

The general manner of operation of the assembly is as follows: the pilot module 3 uses two concurrent logical channels to cater for the exchange of implicitly open corresponding concurrent logical flows. A first concurrent logical flow is used to communicate with one of the applets $App_x$ for example, in execution tracking and monitoring mode designated debugged mode.

The second concurrent logical flow is used to transmit the events originating from the virtual machine VM when, for example, this virtual machine reaches a stopping point or when it executes any operation that the execution tracking and monitoring module 4 has requested be monitored or followed.

Finally, a non-concurrent logical channel, allowing the exchange of a default non-concurrent logical flow, is then used to monitor the execution of the virtual machine VM and to access the internal state of the latter.

The pilot module 3 takes into account the successive retaking of control of the master element E/RM in order to process the asynchronous stopping requests transmitted by the execution tracking and monitoring module 4. If an asynchronous stopping request such as this has arrived at the pilot module and if the latter has retaken control, as represented diagrammatically during the implementation of the method, which is the subject of the present invention, in conjunction with FIG. 2b or 2c, then the execution of the virtual machine VM is suspended. The master element E/RM then transmits the continuation command by way of the pilot module 3 only at the moment at which the user, that is to say the execution tracking and monitoring module 4 controlled by the latter, requests that execution be continued.

The concrete implementation of the execution tracking and monitoring system, which is the subject of the present invention, can make it possible to optimize the format of the APDU commands and responses actually used. For example, to undertake the execution of an instruction, it is in principle necessary firstly to use a monitoring command on the base channel making it possible to route the aforesaid base logical flow, so as to indicate to the embedded computer system 1 the next execution proper by the continuation command [RESUME]. These two commands may be replaced by a single command, such as the command [STEP].

The modus operandi of the pilot module 3 is then as follows:

the pilot module caters for the command of monitoring and of management of the agent module 5 by way of specific command/response pairs, of the APDU type, and designated in the application considered to debugging, for this reason, DPDU, standing for Debug Protocol Data Unit. With this aim, the agent module prompts the exchange of the aforesaid DPDU messages with each transition of input/output I/O performed by the automaton, that is to say of call to the input/output functions by the virtual machine VM. The DPDU messages comprise packets of the command or of the response between application and applet, as described previously in the description in conjunction with FIG. 2b or 2c.

the pilot module 3 moreover suspends, on request from the execution tracking and monitoring module 4, on the initiative of the user, the execution of the execution automaton AUT, that is to say eventually of the virtual machine VM, during input/output exchanges and when this execution automaton executes no input/output transition for a specified time chosen by the aforesaid user.

Following the previously mentioned execution, the pilot module 3 transmits specific command/response pairs, DPDU messages, to the agent module 5 so as to monitor the state of the execution automaton, then to prompt the continuation of the execution of the aforesaid execution automaton AUT.

A comparative description of the modus operandi of the process for tracking and monitoring execution of applets, in the absence of any debugging mode, that is to say for normal execution substantially in accordance with the execution of a virtual machine of the prior art, with reference to FIG. 4a, respectively in debugging mode, by virtue of the implementation of the system and of the protocol, which are the subjects of the present invention, with reference to FIGS. 4b and 4c, will now be given.

With reference to FIG. 4a, it is indicated that, on the embedded computer system 1, that is to say the corresponding chip card, accesses to the inputs/outputs I/O of the virtual machine VM involve calls to a small number of functions of the operating system OS which are considered to offer services equivalent to the interface library API associated with the virtual machine of JAVA CARD type. On the microprocessor card, constituting the embedded computer system 1, the agent 5 for monitoring and tracking execution is set up between the operating system OS and the virtual machine VM. This setup is represented in FIG. 3b.

When it is activated, the agent module 5 intercepts all the calls to these I/O input/output functions and transforms each of these calls into an exchange of DPDU with the pilot module 3.

For normal executions, that is to say in the absence of any debugging mode, as represented in FIG. 4a, the terminal allowing execution of the application 2 dispatches for example a command composed of 5 bytes, or words, of incoming data $C_1$, $C_2$, $C_3$, $C_4$, $C_5$. The applet concerned accesses the incoming data through two calls to the Get Bytes method allowing the transfer of the words $C_1$, $C_2$, then $C_3$, $C_4$, $C_5$, then transmits the four response words of a single operation, the words $R_1$, $R_2$, $R_3$, $R_4$.

Because of the half duplex nature of the ISO 7816 protocol, the chip card constituting the embedded computer system 1 keeps control throughout the duration of the exchange. It is then not possible to interrupt execution, other than by cutting the supply to the card.

When, on the other hand, one switches to debugging mode, in accordance with the implementation of the applet tracking and monitoring system, which is the subject of the present invention, as represented in FIGS. 3a and 3b, the modus operandi is as follows, with reference to FIG. 4b.

In the aforesaid figure, the DPDU commands exchanged between the pilot module 3 and the agent module 5 are represented between square brackets. The agent module 5 behaves with regard to the operating system OS like a normal application and accesses these DPDU commands with the same functions as those used by the applet when the latter is executed in non-debugged mode. These functions are none other than the GET_BYTES and SEND_BYTES functions as well as the functions described previously in the description in respect of the implementation of the method which is the subject of the present invention. The benefit of cutting the exchange of a single command/response into several commands/responses compatible with the ISO 7816 protocol is as follows: between two successive partial exchanges, the input/output channel is free for other exchanges between the pilot module 3 and the agent 5. Such exchanges are invisible to the applet and, of course, to the terminal executing the application 2. These exchanges make it possible to monitor the execution of the virtual machine VM and to access the internal state of the latter.

When the virtual machine VM reaches a stopping point between two calls to the input/output functions, the chip card, by way of the agent module 5, cedes control to the pilot module 3, thereby allowing the execution tracking and monitoring module 4 to inspect the state of the virtual machine VM by way of appropriate commands.

Represented in FIG. 4c by way of nonlimiting example is the execution tracking and monitoring module 4 requesting the value of a variable x. Such an exchange is completely valid physically, since this exchange comprises only well-formed C-APDU and R-APDU commands. Such would not be the case if the exchange in progress between the terminal executing the application 2 and the applet installed in the embedded system 1 had had to be interrupted.

It is thus understood that the inspection of the state of the virtual machine VM is therefore executed when this virtual machine is suspended, on the initiative of the module 4 for tracking and monitoring execution by read/write command of the memory of the computer system 1.

Through such a process for tracking and monitoring execution, that is to say debugging, it is thus possible to multiplex the data which are exchanged between the terminal allowing the execution of the application 2 and the applet $App_x$, on the one hand, and between the pilot module 3 and the tracking and monitoring agent module 5, on the other hand.

Such a modus operandi makes it possible to obtain:
- a total absence of effect on the implementation of the operating system OS, the agent module 5 plus virtual machine VM assembly behaving like an application like any other. In particular, this modus operandi does not necessitate the existence of a second physical communication channel;
- a limited effect on the implementation of the virtual machine, since it is sufficient to replace the calls to a small number of functions of the operating system OS by calls to equivalent functions in the agent module 5.

Finally, the system for tracking and monitoring execution of applets and the method, which are the subject of the present invention, are especially well suited to the execution of asynchronous stoppings of execution of the virtual machine.

Specifically, it is desirable to be able to stop the execution of the virtual machine VM at any moment when, for example, the applet is engaged in a lengthy or endless computation. Having regard to the nature of the link $L_{13}$, it is not possible to pass control to the tracking and monitoring agent module 5 and to wait for the latter to terminate the execution or for the applet $App_x$ to proceed with the execution of an input/output, the agent module 5 being able to cede control only under its own initiative.

The solution proposed, in accordance with the implementation of the system and of the method, which are the subject of the invention, then consists in employing a command which launches the execution of the virtual machine VM, for a specified duration T on completion of which the agent module 5 cedes control to the pilot module 3, which then has the opportunity of suspending execution, or of resuming it, if no suspension request has occurred meanwhile. This process of execution for a specified duration corresponds to the process of FIG. 2d between the master element E/RM, constituted by the application 2 and by the pilot module 3, and the slave element E/RE constituted by the embedded computer system 1, and in particular the tracking and monitoring agent 5. The pilot module 3 can then resume the execution if no suspension request originating from the execution tracking and monitoring module has occurred meanwhile.

At the level of the embedded computer system 1, constituted by a chip card, the implementation of such a command for execution for a specified time can be carried out through the use of a system time downcounter or a simple counter decremented with each instruction to be executed. The precise duration T of execution can be arbitrary, provided that it is finite, that is to say that the agent module 5 finishes by ceding control. The order of magnitude of the value of T of duration of execution determines the reactivity of the system to interrupt requests. The shorter the value of T, the faster the system can interrupt execution. The value of the duration T also determines the overall efficiency of the assembly, since an APDU exchange exists for each execution of duration T. The determination of the order of magnitude of duration T can therefore be performed as a function of requirements, on the initiative of the user.

Finally, the system for tracking and monitoring execution of applets, which is the subject of the invention, also makes it possible to execute the code of an applet source code line by source code line. In general, the lookup table of correspondence between program counter and index number of the lines of the aforesaid source code cannot be stored on the embedded system 1, formed by the chip card, and it is vital to minimize the monitoring exchanges.

The solution allowed by the system and the method, which are the subject of the present invention, consists in associating a programs counter interval for each line of source. This table can be computed by the compiler and stored outside the embedded system 1 in a memory area accessible to the pilot module 3. This accessible memory area can for example be situated in the execution tracking and monitoring module 4. For each line-by-line execution request, the interval corresponding to the current line is transmitted together with the command. For each instruction, the execution of the virtual machine VM is diverted into a code element of the tracking and monitoring agent 5, which then tests whether the programs counter is indeed still in the relevant interval. When this interval is exceeded by the latter, it is because execution has reached a different line from the current line and the agent module 5 cedes control to the pilot module 3.

It is thus possible to transmit the information important to each line-by-line execution request without however, having to store the table of lines on the embedded computer system 1.

Similar stopping conditions involving the size of the stack of the virtual machine allow the simple implementation of other types of symbolic execution, such as execution of a line while skipping the method calls or exit from the current method for example.

What is claimed is:

1. A method for the transmission of a plurality of logical flows for multiple exchange of command/response pairs on a single physical exchange channel between a master transceiver and a slave transceiver, these logical flows comprising at least one base logical flow, initiated by the master transceiver, subject to the same master/slave relation as said single physical exchange channel, the master respectively slave transceiver allowing the execution of at least one software application, comprising the step of:

generating in the one of the base logical flows taken as reference logical flow, a set of concurrent logical flows, wherein:

each concurrent logical flow is formed by successive elementary packets segmenting the command/response pairs, said successive elementary packets forming the set of concurrent logical flows being transmitted on said reference logical flow, two concurrent logical flows of this set allowing the independent and substantially simultaneous transmission of distinct command/response pairs, initiation and continuation of any exchange of command/response pairs is carried out on the initiative of the master transceiver on the basis of specific commands transmitted on this reference flow and the segmentation into successive elementary packets is carried out on the initiative of the slave transceiver on the basis of specific responses transmitted in response to these specific commands on this reference flow, thereby allowing the exchange of independent and substantially simultaneous command/response pairs between at least one pair of applications of the master, respectively slave, transceiver.

2. The method as claimed in claim 1, for logical flows allowing a plurality of base logical flows, comprising the steps of:

a) generating in at least one base logical flow taken as reference logical flow, a set of concurrent logical flows, each concurrent logical flow being formed by successive elementary packets segmenting the command/response pairs, said successive elementary packets forming the set of concurrent logical flows being transmitted on said reference logical flow, two concurrent logical flows of this set allowing the independent and substantially simultaneous transmission of distinct command/response pairs, the initiation and the continuation of any exchange of command/response pairs being carried out on the initiative of the master transceiver on the basis of specific commands transmitted on this reference flow and the segmentation into successive elementary packets being carried out on the initiative of the slave transceiver on the basis of specific responses transmitted in response to these specific commands on this reference flow;

b) suspending the exchange of any concurrent logical flow, upon the activation by said master transceiver of a base logical flow, for execution of an exchange of command/response pairs on this base logical flow distinct from the reference logical flow on said single physical exchange channel;

c) continuing the exchange of any concurrent logical flow immediately upon the end of the execution of the exchange of any base logical flow, thereby allowing, on the one hand, the exchange of independent and substantially simultaneous command/response pairs between at least one pair of applications of the master, respectively slave transceiver, and on the other hand, the exchange of priority command/response pairs on said base logical flows on said single physical exchange channel.

3. The method as claimed in claim 1 wherein said distinct command/response pairs are formed from at least one first and one second specific command and from a first, a second and a third specific response, the first specific command allowing the master transceiver to notify the slave transceiver of the existence of the set of currently active concurrent logical flows;

the second specific command, transmitted on receipt of the first specific response from the slave transceiver to one of the first respectively second specific commands, making it possible to transmit from the master transceiver to the slave receiver, an elementary packet, relating to the currently active command of one of the concurrent logical flows of this set of concurrent logical flows which is designated in this first specific response, the chopping of said currently active command into successive packets being carried out on the initiative of the slave transceiver by specification, in this first specific response, of the maximum size of the packet transmitted in this command;

the second specific response making it possible to transmit, from the slave transceiver to the master transceiver, an elementary packet of the response on a currently active concurrent logical flow designated in this second specific response;

the third specific response consisting of a simple response of end of specific command/response pair sent from the slave transceiver to the master transceiver, the continuation of the exchange of successive packets being carried out on the initiative of the master transceiver on return by the latter of said first specific command.

4. The method as claimed claim 1 wherein said base logical flows are constructed according to the I 7816-3 and ISO 7816-4 process, the command/response pairs being formed by command (C-APDU) respectively response (R-APDU) APDU entities.

5. The method as claimed in claim 4, wherein the master transceiver is constituted by a chip card reader and at least one application connected to this reader and the slave transceiver is constituted by a multi-application chip card.

6. The method as claimed in claim 4 wherein each successive elementary packet forming said concurrent logical flows is transmitted by means of specific APDU command/response pairs on said single physical channel.

7. The as claimed in claim 4 wherein the command/response pairs for executing a base logical flow being constituted by APDU entities, the distinct command/response pairs are formed by a specific APDU command of Envelope type and a short APDU response belonging to a subset of APDU responses.

8. The method as claimed claim 1 wherein each of the concurrent logical flows can be closed respectively opened on the initiative of said master transceiver.

9. A system for tracking and monitoring execution of applets implemented on a computer system furnished with at least one memory, with an execution automation and with an operating system, one at least of these applets being intended to exchange specific information with at least one application executed by a computer furnished with another operating system, comprising at least:

pilot means for tracking and monitoring execution which are linked, on the one hand, to said application, and, on the other hand, to said computer system by way of a single physical exchange link of command/response type;

means for tracking and monitoring execution which are interconnected with said pilot means and are intended to monitor the execution of said execution automation of said computer system;

an agent module for tracking and monitoring execution of the execution automationn installed in said computer system, wherein:

said pilot means effecting the control of monitoring and of management of the agent module by way of specific command/response pairs, DPDU messages, on the single physical exchange channel, with each input/output transition, said agent module triggers the exchange of DPDU messages comprising packets of the command or of the response between applications and applets;

said pilot means suspend, on request from the means for tracking and monitoring execution, the execution of the execution automation during input/output exchanges and when this execution automation executes no input/output transition for a specified time, said pilot means then having regained control, and, following the suspension of this execution, said pilot means transmit specific command/response pairs, DPDU messages, to the agent module so as to access the state of the execution automation then prompt the continuation of the execution of this execution automation by means of a specific command.

10. The system as claimed in claim 9, wherein said computer system is an embedded system constituted by a microprocessor card, and wherein said pilot means comprising a microprocessor card reader, said physical exchange link of command/response type is an ISO 7816 link.

11. The system as claimed in claim 10 wherein said execution automation comprises a virtual machine and an application interfacing library (API).

12. The system as claimed in claim 9 wherein said means for monitoring execution comprise at least one means for controlling reading of the memory of said computer system.

13. The system as claimed claim 9 wherein said means for monitoring execution furthermore comprise means for monitoring the execution of the execution automation of said computer system.

14. The system as claimed in claim 13 wherein said means for monitoring execution are linked to said pilot means by a JDWP protocol, thereby making it possible to use any tracking and monitoring tool adapted to this protocol.

15. The system as claimed in claim 9 wherein said means for monitoring execution furthermore comprise means for controlling writing of the memory of said computer system.

* * * * *